US011269522B2

(12) United States Patent
Ananthanarayanan et al.

(10) Patent No.: US 11,269,522 B2
(45) Date of Patent: Mar. 8, 2022

(54) PRIVATE DATA ANALYTICS

(71) Applicant: Microsoft Technology Licensing, LLC, Redmond, WA (US)

(72) Inventors: Ganesh Ananthanarayanan, Seattle, WA (US); Stavros Volos, Cambridge (GB); Srinath T. V. Setty, Redmond, WA (US); Rishabh Poddar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 16/513,296

(22) Filed: Jul. 16, 2019

(65) Prior Publication Data

US 2021/0019893 A1  Jan. 21, 2021

(51) Int. Cl.
G06K 9/62 (2006.01)
G06F 3/06 (2006.01)
G06N 3/08 (2006.01)
G06F 13/16 (2006.01)
G06F 21/60 (2013.01)
G06T 7/194 (2017.01)
G06K 9/00 (2022.01)

(52) U.S. Cl.
CPC ............ *G06F 3/0622* (2013.01); *G06F 13/16* (2013.01); *G06F 21/606* (2013.01); *G06N 3/08* (2013.01); *G06K 9/00765* (2013.01); *G06T 7/194* (2017.01)

(58) Field of Classification Search
CPC ...... G06F 3/0622; G06F 21/606; G06F 13/16; G06F 21/74; G06F 21/75; G06F 21/6245; G06N 3/08; G06T 7/194; G06K 9/00765
See application file for complete search history.

(56) References Cited

U.S. PATENT DOCUMENTS

| 7,587,616 | B2* | 9/2009 | Jakubowski | G06F 8/51 |
| | | | | 713/189 |
| 7,712,143 | B2 | 5/2010 | Comlekoglu | |
| 9,087,202 | B2 | 7/2015 | Kang et al. | |
| 9,456,131 | B2 | 9/2016 | Tran | |
| 9,715,597 | B2 | 7/2017 | Smith et al. | |
| 2003/0231769 | A1* | 12/2003 | Bolle | H04L 9/0847 |
| | | | | 380/210 |
| 2006/0120619 | A1* | 6/2006 | Avidan | H04K 1/00 |
| | | | | 382/276 |
| 2007/0201694 | A1* | 8/2007 | Bolle | G06T 1/0021 |
| | | | | 380/205 |
| 2008/0111883 | A1* | 5/2008 | Maolin | G08B 13/19602 |
| | | | | 348/143 |

(Continued)

OTHER PUBLICATIONS

Moghimi, et al., "Cachezoom: How SGX amplifies the power of cache attacks", In Proceedings of the Conference on Cryptographic Hardware and Embedded Systems, Sep. 25, 2017, 14 Pages.

(Continued)

*Primary Examiner* — Samir A Ahmed

(57) ABSTRACT

This document relates to performing video analytics on a cloud device that preserves privacy. One example uses data-oblivious algorithms to process input video data, where the data-oblivious algorithms can assist with preventing attackers from exploiting side-channels induced by data-dependent access patterns.

20 Claims, 7 Drawing Sheets

(56) References Cited

U.S. PATENT DOCUMENTS

| | | | |
|---|---|---|---|
| 2015/0015735 A1* | 1/2015 | Rav-Acha | H04N 5/23222 |
| | | | 348/222.1 |
| 2017/0372226 A1* | 12/2017 | Costa | G06N 20/00 |
| 2018/0322646 A1* | 11/2018 | Matthies | B64C 39/024 |
| 2018/0367317 A1* | 12/2018 | Forler | G06F 21/86 |
| 2019/0012761 A1 | 1/2019 | Risinger et al. | |
| 2019/0034235 A1 | 1/2019 | Yang et al. | |

OTHER PUBLICATIONS

Naghibijouybari, et al., "Constructing and Characterizing Covert Channels on GPGPUs", In Proceedings of the 50th Annual IEEE/ACM International Symposium on Microarchitecture, Oct. 14, 2017, 13 Pages.

Naghibijouybari, et al., "Rendered Insecure: GPU Side Channel Attacks are Practical", In Proceedings of the ACM Conference on Computer and Communications Security, Oct. 15, 2018, 16 Pages.

NASR, "Machine Learning with Membership Privacy Using Adversarial Regularization", In Proceedings of the 2018 ACM SIGSAC Conference on Computer and Communications Security, Oct. 15, 2018, pp. 634-646.

Neal, et al., "Video Surveillance in the Cloud?", In International Journal on Cryptography and Information Security, vol. 2, No. 3, Sep. 2012, pp. 1-19.

Oh, et al., "Towards Reverse-Engineering Black-Box Neural Networks", In Proceedings of the 6th International Conference on Learning Representations, Apr. 30, 2018, pp. 1-20.

Ohrimenko, et al., "Oblivious Multi-Party Machine Learning on Trusted Processors", In Proceedings of 25th USENIX Security Symposium, Aug. 10, 2016, pp. 1-18.

Ohrimenko, et al., "Varys: Protecting SGX Enclaves from Practical Side-Channel Attacks", In Proceedings of the USENIX Annual Technical Conference, Jul. 11, 2018, pp. 227-239.

Rane, et al., "Raccoon: Closing Digital Side-Channels through Obfuscated Execution", In Proceedings of 24th USENIX Security Symposium, Aug. 12, 2015, 3 Pages.

Redmon, et al., "You Only Look Once: Unified, Real-Time Object Detection", In Proceedings of IEEE Conference on Computer Vision and Pattern Recognition, Jun. 27, 2016, pp. 1-10.

Riazi, et al., "Chameleon: A Hybrid Secure Computation Framework for Machine Learning Applications", In Proceedings of the ACM Asia Conference on Computers Communications Security, Jun. 4, 2018, pp. 1-15.

Rosenfeld, et al., "Sequential Operations in Digital Picture Processing", In Journal of the ACM, vol. 13, Issue 4, Oct. 1966, pp. 471-494.

Rouhani, et al., "Deepsecure: Scalable Provably-Secure Deep Learning", In Proceedings of the 55th Annual Design Automation Conference, Jun. 24, 2018, 13 Pages.

Salem, et al., "Ml-leaks: Model and Data Independent Membership Inference Attacks and Defenses on Machine Learning Models", In Proceedings of the Network and Distributed System Security Symposium, Feb. 24, 2019, 15 Pages.

Sasy, et al., "ZeroTrace: Oblivious Memory Primitives from Intel SGX", In Proceedings of the Network and Distributed System Security Symposium, Feb. 18, 2018, 15 Pages.

Schuster, et al., "Beauty and the Burst: Remote Identification of Encrypted Video Streams", In Proceedings of 26th USENIX Security Symposium, Aug. 16, 2017, p. 1357-1374.

Schwarz, et al., "Malware Guard Extension: Using SGX to Conceal Cache Attacks", In Proceedings of the Conference on Detection of Intrusions and Malware & Vulnerability Assessment, Jul. 6, 2017, 17 Pages.

Shih, et al., "T-SGX: Eradicating Controlled-Channel Attacks against Enclave Programs", In Proceedings of the Network and Distributed System Security Symposium, Feb. 26, 2017, 15 Pages.

Shinde, et al., "Preventing Page Faults from Telling Your Secrets", In Proceedings of the 11th ACM on Asia Conference on Computer and Communications Security, May 30, 2016, pp. 317-328.

Shokri, et al., "Membership Inference Attacks Against Machine Learning Models", In Proceedings of IEEE Symposium on Security and Privacy, May 22, 2017, pp. 1-16.

Sinha, et al., "A Compiler and Verifier for Page Access Oblivious Computation", In Proceedings of the Symposium on the Foundations of Software Engineering, Sep. 4, 2017, 17 Pages.

Song, et al., "Machine Learning Models That Remember Too Much", In Proceedings of the ACM Conference on Computer and Communications Security, Oct. 30, 2017, 15 Pages.

Stefanov, et al., "Path ORAM: An extremely simple oblivious RAM protocol", In Proceedings of the ACM Conference on Computer and Communications Security, Nov. 4, 2013, pp. 1-25.

Suzuki, et al., "Topological Structural Analysis of Digitized Binary Images by Border Following", In Proceedings of Computer Vision, Graphics, and Image Processing, vol. 30, Issue 1, Apr. 1985, pp. 32-46.

Tramer, et al., "Slalom: Fast, Verifiable and Private Execution of Neural Networks in Trusted Hardware", In Proceedings of the International Conference on Learning Representations, May 6, 2019, pp. 1-19.

Tramer, et al., "Stealing Machine Learning Models via Prediction APIs", In Proceedings of the USENIX Security Symposium, Aug. 10, 2016, pp. 601-618.

Tsai, et al., "Graphene-SGX: A Practical Library OS for Unmodified Applications on SGX", In Proceedings of the USENIX Annual Technical Conference, Jul. 12, 2017, pp. 645-658.

Volos, et al., "Graviton: Trusted Execution Environments on GPUs", In Proceedings of the USENIX Symposium on Operating Systems Design and Implementation, Oct. 8, 2018, pp. 681-696.

Wang, et al., "Leaky Cauldron on the Dark Land: Understanding Memory Side-Channel Hazards in SGX", In Proceedings of the ACM SIGSAC Conference on Computer and Communications Security, Oct. 30, 2017, pp. 2421-2434.

Wang, et al., "Stealing Hyperparameters in Machine Learning", In Proceedings of the IEEE Symposium on Security and Privacy, May 21, 2018, 17 Pages.

Xu, et al., "Controlled-Channel Attacks: Deterministic Side Channels for Untrusted Operating Systems", In Proceedings of the IEEE Symposium on Security and Privacy, May 17, 2015, pp. 640-656.

Yao, "How to generate and exchange secrets", In Proceedings of the 27th Annual Symposium on Foundations of Computer Science, Oct. 27, 1986, pp. 162-167.

Zhang, et al., "AWStream: Adaptive Wide-area Str", In Proceedings of the ACM SIGCOMM Conference on Applications, Technologies, Architectures, and Protocols for Computer Communication, Aug. 20, 2018, pp. 236-252.

Zhang, et al., "Live video analytics at scale with approximation and delay-tolerance", In Proceedings of 14th USENIX Symposium on Networked Systems Design and Implementation, Mar. 27, 2017, pp. 377-397.

Zhu, et al., "Enabling Privacy-Preserving, Compute- and Data-Intensive Computing using Heterogeneous Trusted Execution Environment", In Journal of Computing Research Repository, Apr. 2019, pp. 1-16.

Zivkovic, et al., "Efficient Adaptive Density Estimation per Image Pixel for the Task of Background Subtraction", In Journal of Pattern Recognition Letters, vol. 27, Issue 1, Jan. 2006, pp. 1-8.

Chandra et al., "Securing Data Analytics on SGX with Randomization", In Proceedings of European Symposium on Research in Computer Security, Aug. 12, 2017, pp. 352-369.

Mishra et al., "Oblix: An Efficient Oblivious Search Index", In Proceedings of IEEE Symposium on Security and Privacy (SP), May 20, 2018, pp. 279-296.

"International Search Report and Written Opinion Issued in PCT Application No. PCT/US2020/034584", dated Aug. 10, 2020, 13 Pages.

"Amazon Rekognition", Retrieved From: https://aws.amazon.com/rekognition/, May 12, 2019, 24 Pages.

"FFmpeg", Retrieved From: https://web.archive.org/web/20190511015657/https:/www.ffmpeg.org/, May 11, 2019, 23 Pages.

(56) References Cited

OTHER PUBLICATIONS

"IBM Cloud Data Shield", Retrieved From: https://web.archive.org/web/20190504214826/https:/www.ibm.com/cloud/data-shield, May 4, 2019, 4 Pages.

"Instruction Set Reference", Retrieved From: https://docs.nvidia.com/cuda/cuda-binary-utilities/index.html#instruction-set-ref., May 2019.

"Microsoft Azure Confidential Computing", Retrieved From:https://azure.microsoft.com/en-us/solutions/confidential-compute/, Dec. 12, 2018.

"Microsoft Azure Media Analytics", Retrieved From: https://azure.microsoft.com/en-in/services/media-services/media-analytics/, Jun. 3, 2016, 11 Pages.

"Nouveau: Accelerated open source driver for NVIDIA cards", Retrieved From: https://web.archive.org/web/20190516091350/https:/nouveau.freedesktop.org/wiki/, May 26, 2019, 2 Pages.

"OpenCV", Retrieved From: http://opencv.org, retrieved on May 28, 2013, 3 Pages.

Abadi, et al.,"Deep learning with differential privacy", In Proceedings of the ACM SIGSAC Conference on Computer and Communications Security, Oct. 24, 2016, pp. 308-318.

Ahmad, et al., "Obfuscuro: A Commodity Obfuscation Engine on Intel SGX", In Proceedings of the Network and Distributed System Security Symposium, Feb. 24, 2019, pp. 1-15.

Bankoski, et al., "Technical overview of VP8, an open source video codec for the web", In Proceedings of IEEE International Conference on Multimedia and Expo, Jul. 11, 2011, 6 Pages.

Bankoski, et al., "VP8 Data Format and Decoding Guide", In Proceedings of the Independent Submission Request for Comments (RFC) 6386, Published by The Internet Engineering Task Force (IETF), ISSN No. 2070-1721, Nov. 2011, 304 Pages.

Batcher, K. E.., "Sorting Networks And Their Applications", In Proceedings ofthe AFIPS Spring Joint Computer Conference, Apr. 30, 1968, pp. 307-314.

Bouwmans, et al., "Background Modeling using Mixture of Gaussians for Foreground Detection—A Survey", In Journal of Recent Patents on Computer Science, vol. 1, Issue 3, Nov. 1, 2008, 20 Pages.

Brandenburger, et al., "Rollback and Forking Detection for Trusted Execution Environments using Lightweight Collective Memory", In Proceedings of the IEEE/IFIP International Conference on Dependable Systems & Networks, Jun. 26, 2017, pp. 1-23.

Brasser, et al., "Software Grand Exposure: SGX Cache Attacks Are Practical", In Proceedings of the 11th USENIX Conference on Offensive Technologies, Aug. 14, 2017, pp. 1-12.

Bulck, et al., "Foreshadow: Extracting the Keys to the Intel SGX Kingdom with Transient Out-of-Order Execution", In Proceedings of the 27th USENIX Security Symposium, Aug. 15, 2018, pp. 991-1008.

Bulck, et al., "Telling Your Secrets without Page Faults: Stealthy Page Table-Based Attacks on Enclaved Execution", In Proceedings of the 26th USENIX Security Symposium, Aug. 16, 2017, pp. 1041-1056.

Cenzil, et al., "A GPU-Based Convolutional Neural Network Approach for Image Classification", In Proceedings of International Artificial Intelligence and Data Processing Symposium, Sep. 16, 2017, 6 Pages.

Chen, et al., "Detecting Privileged Side-Channel Attacks in Shielded Execution with Deja Vu", In Proceedings of the ACM on Asia Conference on Computer and Communications Security, Apr. 2, 2017, pp. 7-18.

Dowlin, et al., "CryptoNets: Applying neural networks to encrypted data with high throughput and accuracy", In Proceedings of the 33nd International Conference on Machine Learning, Jun. 19, 2016, 10 Pages.

Eppstein, et al., "Privacy-preserving Data-oblivious Geometric Algorithms for Geographic Data", In Proceedings ofthe 18th SIGSPATIAL International Conference on Advances in Geographic Information Systems, Nov. 2, 2010, pp. 13-22.

Fredrikson, et al., "Model Inversion Attacks that Exploit Confidence Information and Basic Countermeasures", In Proceedings of the 22nd ACM SIGSAC Conference on Computer and Communications Security, Oct. 12, 2015, pp. 1322-1333.

Fredrikson, et al., "Privacy in Pharmacogenetics: An End-to-end Case Study of Personalized Warfarin Dosing", In Proceedings of the USENIX Security Symposium, pp. 17-32.

Goldreich, et al., "Software Protection and Simulation on Oblivious RAMs", In Journal of ACM, vol. 43, Issue 3, May 1996, pp. 431-473.

Gotzfried, et al., "Cache Attacks on Intel SGX", In Proceedings of the 10th European Workshop on Systems Security, Article No. 2, Apr. 23, 2017, 6 Pages.

Grover, et al., "Privado: Practical and secure DNN inference", IN Journal of Computing Research Repository, Oct. 2018, 13 Pages.

Gruss, et al., "Strong and efficient cache side-channel protection using hardware transactional memory", In Proceedings of the 26th USENIX Conference on Security Symposium, Aug. 16, 2017, pp. 217-233.

Hahnel, et al., "High-Resolution Side Channels for Untrusted Operating Systems", In Proceedings of the USENIX Conference on Usenix Annual Technical Conference, Jul. 12, 2017, pp. 299-312.

Hossain, Anwar M . . . , "Framework for a Cloud-Based Multimedia Surveillance System", In International Journal of Distributed Sensor Networks, vol. 10, Issue 5, May 18, 2014, pp. 1-11.

Hsieh, et al., "Focus: Querying Large Video Datasets with Low Latency and Low Cost", In Proceedings of 13th Symposium on Operating Systems Design and Implementation, Oct. 8, 2018, pp. 269-286.

Hunt, et al., "Chiron: Privacy-preserving Machine Learning as a Service", In Journal of Computing Research Repository, Mar. 2018, pp. 1-15.

Iyengar, et al., "Towards Practical Differentially Private Convex Optimization", In Proceedings of the IEEE Symposium on Security and Privacy, May 20, 2019, 18 Pages.

Jain, A. K., "Fundamentals of Digital Image Processing", In Book Published by Prentice Hall, 1989, pp. 44-85.

Jang, et al., "Heterogeneous Isolated Execution for Commodity GPUs", In Proceedings of the Twenty-Fourth International Conference on Architectural Support for Programming Languages and Operating Systems, Apr. 13, 2019, pp. 455-468.

Jang, et al., "SGX-Bomb: Locking Down the Processor via Rowhammer Attack", In Proceedings of the 2nd Workshop on System Software for Trusted Execution, Oct. 28, 2017.

Jia, et al., "Caffe: Convolutional Architecture for Fast Feature Embedding", In Proceedings of the 22Nd ACM International Conference on Multimedia, Nov. 3, 2014, pp. 675-678.

Jiang, et al., "A Complete Key Recovery Timing Attack on a GPU", In Proceedings of the International Symposium on High-Performance Computer Architecture, Mar. 12, 2016, pp. 1-12.

Jiang, et al., "A Novel Side-Channel Timing Attack on GPUs", In Proceedings of the Great Lakes Symposium on VLSI, May 10, 2017, pp. 167-172.

Jiang, et al., "Chameleon: Scalable Adaptation of Video Analytics", In Proceedings of the Conference of the ACM Special Interest Group on Data Communication, Aug. 20, 2018, pp. 253-266.

Juvekar, et al., "Gazelle: A Low Latency Framework for Secure Neural Network Inference", In Proceedings of the 27th USENIX Conference on Security Symposium, Aug. 15, 2018, pp. 1651-1668.

Kang, "NoScope: Optimizing Neural Network Queries over Video at Scale", In Proceedings of the VLDB Endowment, vol. 10, No. 11, Aug. 1, 2017, pp. 1586-1597.

Kato, et al., "Gdev: First-class GPU resource management in the operating system", In USENIX Conference on Annual Technical Conference, 2012, 12 Pages.

Lee, et al., "Inferring fine-grained control flow inside SGX enclaves with branch shadowing", In Journal of Computing Research Repository, Aug. 16, 2017, pp. 557-574.

Zivkovic, Zoran, "Improved adaptive gaussian mixture model for background subtraction", In Proceedings of 17th International Conference on Pattern Recognition, Aug. 23, 2004, 4 Pages.

Liu, et al., "GhostRider: A Hardware-Software System for Memory Trace Oblivious Computation", In Proceedings of the Twentieth

(56) References Cited

OTHER PUBLICATIONS

International Conference on Architectural Support for Programming Languages and Operating Systems, Mar. 14, 2015, pp. 87-101.

Liu, et al., "Oblivious Neural Network Predictions via MiniONN Transformations", In Proceedings of the ACM SIGSAC Conference on Computer and Communications Security, Oct. 30, 2017, pp. 619-631.

Maesschalck, et al., "The Mahalanobis Distance", In Journal of Chemometrics and Intelligent Laboratory Systems vol. 50, Jan. 2000, pp. 1-18.

Matetic, et al., "ROTE: Rollback protection for trusted execution", In Proceedings of the 26th USENIX Security Symposium, Aug. 16, 2017, pp. 1289-1306.

McKeen, et al., "Innovative Instructions and Software Model for Isolated Execution", In Proceedings of the 2nd International Workshop on Hardware and Architectural Support for Security and Privacy, Jun. 23, 2013, pp. 1-8.

* cited by examiner

PRIVATE DATA ANALYTICS

BACKGROUND

Video cameras and other Internet of Things (IoT) devices are being increasingly deployed throughout the world, buoyed by their falling costs and the many applications they enable, such as traffic planning, retail experience, and enterprise security. The proliferation of such devices has led to a considerable need for "analytics-as-a-service" platforms in the cloud. For example, videos from the cameras can be streamed to the cloud, where they can be processed using a variety of techniques, such as a video analytics pipeline that may use various computer vision techniques and/or convolutional neural networks (CNNs), such as an object detector CNN, to provide detailed analysis of the video stream.

However, privacy of the streamed content is of paramount concern for the "analytics-as-a-service" model. For example, videos can often contain sensitive information, such as people in workspaces and workflows of manufacturing plants, and this information can be vulnerable to attack. As a result, confidentiality is important such as to not reveal videos' contents, neither to the cloud operator nor to other co-tenants. In addition, integrity is essential to ensure that the contents of the videos and results of the analysis are not tampered with, especially when the results are used for downstream actuations in the manufacturing plant or for later analyses.

As such, while the use of cloud services can provide the ability to analyze live video streams, the processing of such content via a video processing pipeline introduces avenues for attack, and there remain difficulties in performing video analytics in a secure and confidential manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for performing secure video analytics. One example includes a system that includes a central processing unit having a first enclave within a trusted execution environment, the first enclave being configured to perform secure processing on the central processing unit. The system further includes a secondary processing unit having a second enclave within a trusted execution environment, the second enclave being configured to perform secure processing on the secondary processing unit, and a computer-readable storage media storing computer-readable instructions, which when executed by the central processing unit, causes data processing to be performed within the first and second enclaves, the data processing including additional obliviousness processing that obscures individual processing stages and further obscures communication of data between the first and second enclaves.

Another example includes a system that includes a central processing unit providing an enclave in a trusted execution environment. The system further includes a computer-readable storage medium storing computer-readable instructions, which when executed by the central processing unit, cause the system to receive input data for processing in the enclave, perform analytics processing of the input data, the analytics processing including oblivious processing that renders access patterns or operations data-independent, and perform oblivious processing on results from the analytics processing to obscure communication of the results from the analytics processing.

Another example includes a method or technique that can be performed on a computing device. The method can include receiving input data from one or more client sources, performing analytics processing of the input data on a CPU to generate processed data, the analytics processing using data-oblivious algorithms that prevent data-dependent memory access patterns during analytics processing, performing oblivious processing on the processed data to obscure the transfer of the processed data from the CPU to a secondary processing unit for additional processing, and providing results of the additional processing to the one or more client sources.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

I. Overview

Figure 1:
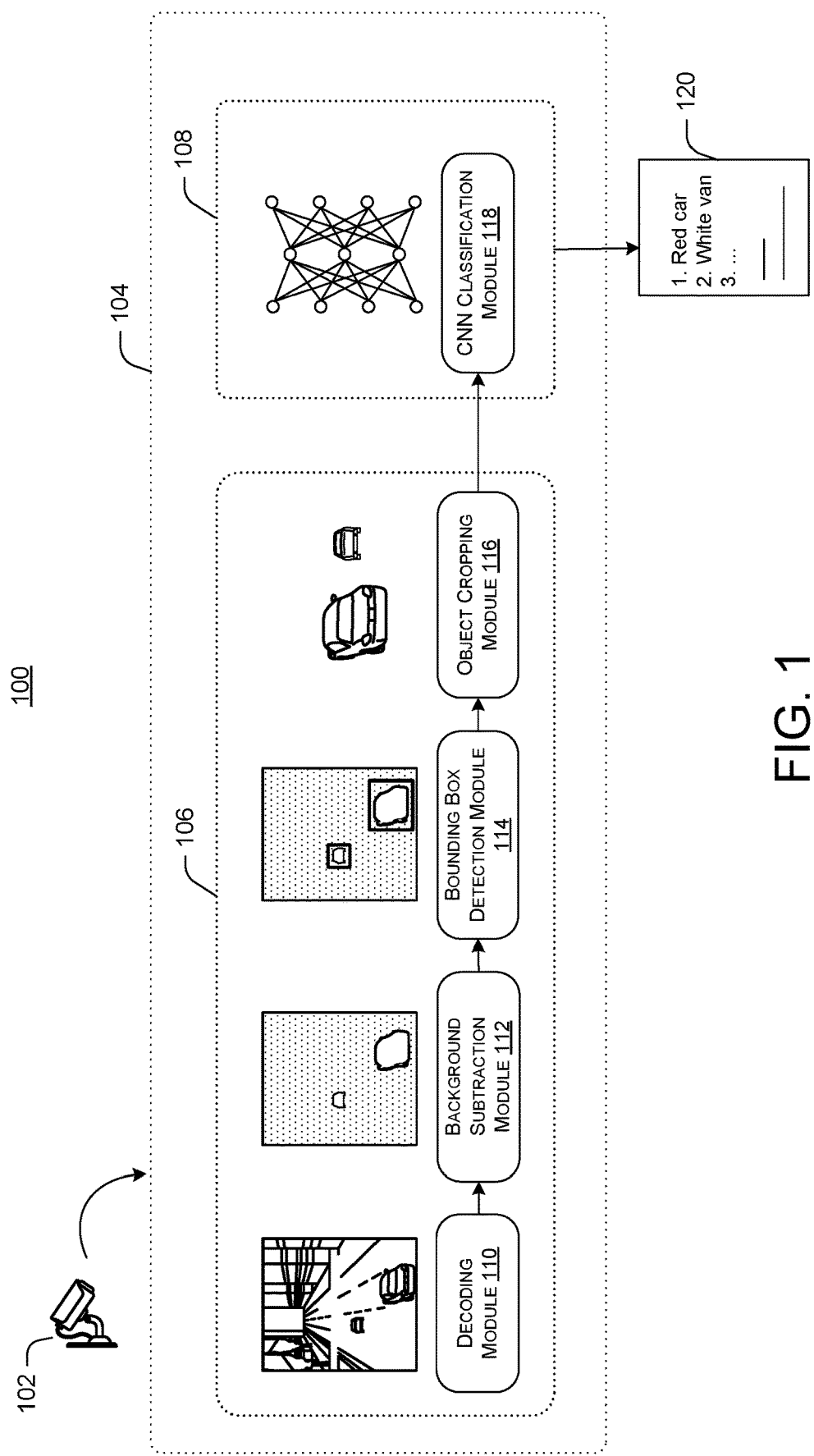
FIG. 1 illustrates an example system that is consistent with some implementations of the present concepts.

The increasing use of smart IoT devices that rely on cloud-based data processing has brought on new challenges to securing content, due to potential susceptibility of streamed video content to attack. In some instances, trusted execution environments (TEEs) can be used to enable privacy-preserving video analytics in the cloud. In contrast to cryptographic approaches to privacy, such as homomorphic encryption, TEEs can rely on the assumption that cloud tenants trust the hardware in addition to cryptography. The hardware gives the cloud tenants the ability to create secure containers (or "enclaves") that are protected against privileged attackers. TEEs may present a more compelling solution than cryptographic techniques as they can provide orders of magnitude better performance. Recent advancements in central processing unit (CPU) and graphics processing unit (GPU) TEEs present an opportunity for preserving the privacy of video analytics.

Unfortunately, these types of TEEs (e.g., a CPU TEE, such as Intel SGX) can be vulnerable to a host of side-channel attacks. For example, an attacker could observe the memory access patterns of a background subtraction module, and based on these observations, can infer the exact shapes and positions of all moving objects in the video.

Thus, in general, an attacker can infer crucial information about the video being processed, such as the times when there is activity in the video, or when and where objects appear in the video frame. This information, combined with knowledge about the physical space being covered by the camera, can lead to violations of confidentiality.

Furthermore, while a CPU TEE can provide a relatively secure environment for processing data, there may be additional heavy processing of the data that may be performed by a specialized processing device with enclave capabilities, such as a GPU. While the GPU may have an associated TEE, the transmission of such secure data from the CPU TEE to the GPU TEE can present an unsecured avenue that may be susceptible to attack.

As such, this disclosure is directed to an analytics system that can ensure confidentiality and integrity for streamed data sets of content, such as a user's video stream, in the presence of a potentially compromised cloud platform and untrusted co-tenants. The analytics system can execute video pipelines in a hybrid TEE that spans discrete processing hardware that can provide secure enclaves, such as a CPU and a GPU, protecting against attacks to the sensitive code and data as well as the communication channel between the TEEs. In addition, data-oblivious algorithms for each component of the video analytics pipeline can be provided, so as to prevent attackers from exploiting side-channels induced by data-dependent access patterns. The system can additionally protect model parameters and weights that may be associated with CNNs hosted in the cloud. For purposes of this disclosure, "data-oblivious" and "obliviousness" mean that data is processed in a manner that obscures processing operations to mitigate or eliminate opportunities for external observers to detect data-dependent processing characteristics.

In video stream processing scenarios where the streamed data sets of content may be video data, vision algorithms can be used in a video analytics pipeline to determine the existence of moving objects in a video clip and extract the moving "foreground" objects. These algorithms (i.e., background subtraction, bounding box detection, and object cropping) together can serve as "cheap" (i.e., computationally inexpensive) filters to discard frames that lack any significant movement, instead of invoking CNNs on each frame when the frame may not include movement. For example, in a video stream, only a fraction of the overall video may have movement that a user may potentially be interested in, and as such, the frames that do not contain any noticeable movement can be discarded to save processing requirements. For frames that do contain movement, a CPU vision module can extract foreground objects and pass them to GPUs for CNN classification. However, as these modules serve as filters, monitoring the data flow in the CPU-GPU channel can allow attackers to potentially infer the frames with moving objects and the number of these objects.

As such, the system described herein can produce a data-oblivious CPU-GPU data channel by using data objects or performing dummy operations, such as by padding the channel with dummy objects, and can further reduce the necessity of running CNN inference on the dummy objects. Furthermore, the system can make the CNNs data-oblivious by eliminating some or all conditional operations in the neural network's architecture.

FIG. 1 depicts an example video analytics pipeline for processing of data sets, which in certain implementations can be video data or video streams. However, it is to be appreciated that while the video analytics pipeline described in FIG. 1 may be associated with video data, other types of processing can be performed according to the disclosed methods on other types of data included in the data sets.

As depicted in FIG. 1, one or more client sources 102 (e.g., a source camera) can feed a data set, such as a video stream, to a cloud device 104, which may provide analytical processing for the client source by way of, for example, executing a variety of module via central processing unit 106, or executing a variety of modules via a secondary processing unit 108, or both. In some implementations, central processing unit 106 may provide a CPU enclave for enabling secure execution of instructions. Furthermore, secondary processing unit 108 may be, in some implementations, a graphics processing unit that may provide a GPU enclave for enabling secure execution of instructions. It is to be appreciated that the analytical processing may be performed by other types of hardware processing devices, and central processing unit 106 or secondary processing unit 108 can be any dedicated hardware component or device that provides enclave capabilities.

Cloud device 104 may perform specific processing that may decode the video into frames, extract objects from the frames using vision algorithms, and classify each of the objects using a pre-trained CNN. For example, as depicted in FIG. 1, a video analytics pipeline associated with tracking a vehicle may involve various processing components, such as decoding module 110, background subtraction module 112, bounding box detection module 114, and object cropping module 116.

Decoding module 110 may receive as input a live video stream from client source 102 and extract frame data from the live video stream to produce extracted video frames, which can be passed to background subtraction module 112. Background subtraction module 112 can perform background subtraction on the frame data, which can detect changes in each frame, and if a change in a region of interest of the frame is detected, background subtraction module 112 can pass the frame to bounding box detection module 114 for further processing, such as to form a bounding box around objects of interest within the frame. Then, object cropping module 116 may crop the objects contained in the bounding box. These cropped objects can then be provided to a CNN classification module 118, which can produce a listing 120 of classified objects to client source 102.

In certain instances, the vision algorithms (i.e., video decoding, background subtraction, and bounding box detection) can be performed by a central processing unit 106 while sustaining the incoming frame rate of videos. In some cases, the CNN classification can involve the use of specialized hardware, and as such may be performed by secondary processing unit 108, such as a GPU. However, because the video content can be transferred via a communication channel between the CPU to the GPU, data can become potentially exposed to attack, due to the data being outside of a TEE during the transfer.

Generally, TEEs can be used to protect an application's code and data from all other software in a system by creating a secure enclave within the system. Certain types of TEEs can be provided on CPUs, where the CPU can enforce isolation by storing enclave code and data in a protected region of memory called the Enclave Page Cache (EPC). The hardware can ensure that no software outside the enclave can access EPC contents. Further, TEEs on GPUs can be implemented that work in tandem with trusted applications hosted in CPU TEEs. For example, a trusted GPU runtime hosted in the CPU TEE can attest that all code and data have been securely loaded onto the GPU.

However, the increased outsourcing of processing to cloud servers can create additional complications to securing of data in TEEs. For example, a cloud service provider may serve many clients, and each client may wish to ensure that their video streams are secured from other clients who also use the cloud service provider for processing. Moreover, the client may wish to conceal certain processing data from the cloud provider, such as CNN model weights used by CNN classification module 118. Alternatively, in some implementations, the cloud service provider may own the CNN model and may wish not to reveal to clients anything about the model weights beyond what can be inferred from the model's results.

In either instance, a typical hardware enclave attacker may attempt to compromise the entire software stack outside of the enclave, as the attacker cannot see the enclave's contents. Attacks on enclaves can exploit micro-architectural side-channels, software-based channels, or application-specific leakage, such as network and memory access patterns. The system described herein provides protection against channels of attack that exploit data-dependent access patterns, which represent the vast majority of known attacks on enclaves, including most micro-architectural side-channel attacks (e.g., classical cache timing and branch-prediction attacks). The system can additionally prevent the channel from leaking secrets via access patterns.

To protect against attacks, the analytics system seeks to provide data-obliviousness. Data-obliviousness can be achieved based on a simulation processing, which first begins by defining a trace of observations that a potential attacker can see in an attacker model. Next, information that is public (i.e., information that is not hidden and thus may be known to the attacker) can be determined. Then, a simulation can be provided, such that for all video streams V, when given as input only the public information about V and the size of V, the simulation can simulate the trace an attacker would observe when the analytics system processes V. If, upon simulation, the simulator produces the same observations as a potential attacker even without knowing the private (non-public) data in the video stream, the system can imply that the video data is hidden.

The attacker model can use as a trace of observations the sequence of the addresses of memory references along with the accessed data. The public information that can be accessed may be portions of the analytics system's algorithms, formatting and sizing information, but the public information may exclude the video data. For example, with reference to the pipeline of FIG. 1, the public information about each algorithm in the pipeline can be as follows:

Video decoding: (i) Metadata of video stream (format, frame rate, resolution); (ii) A predefined upper bound on the number of bits used to encode each row of macroblocks.
Background subtraction: Nothing additional.
Bounding box detection: (i) An upper bound on the number of objects per image; (ii) An upper bound on the number of different labels that can be assigned to pixels (an object consists of all labels that are adjacent to each other).
Object cropping: An upper bound on the object size.
Inference: CNN architecture.
Overall: Modules and algorithms used in the pipeline.

II. Overall Architecture

Figure 2:
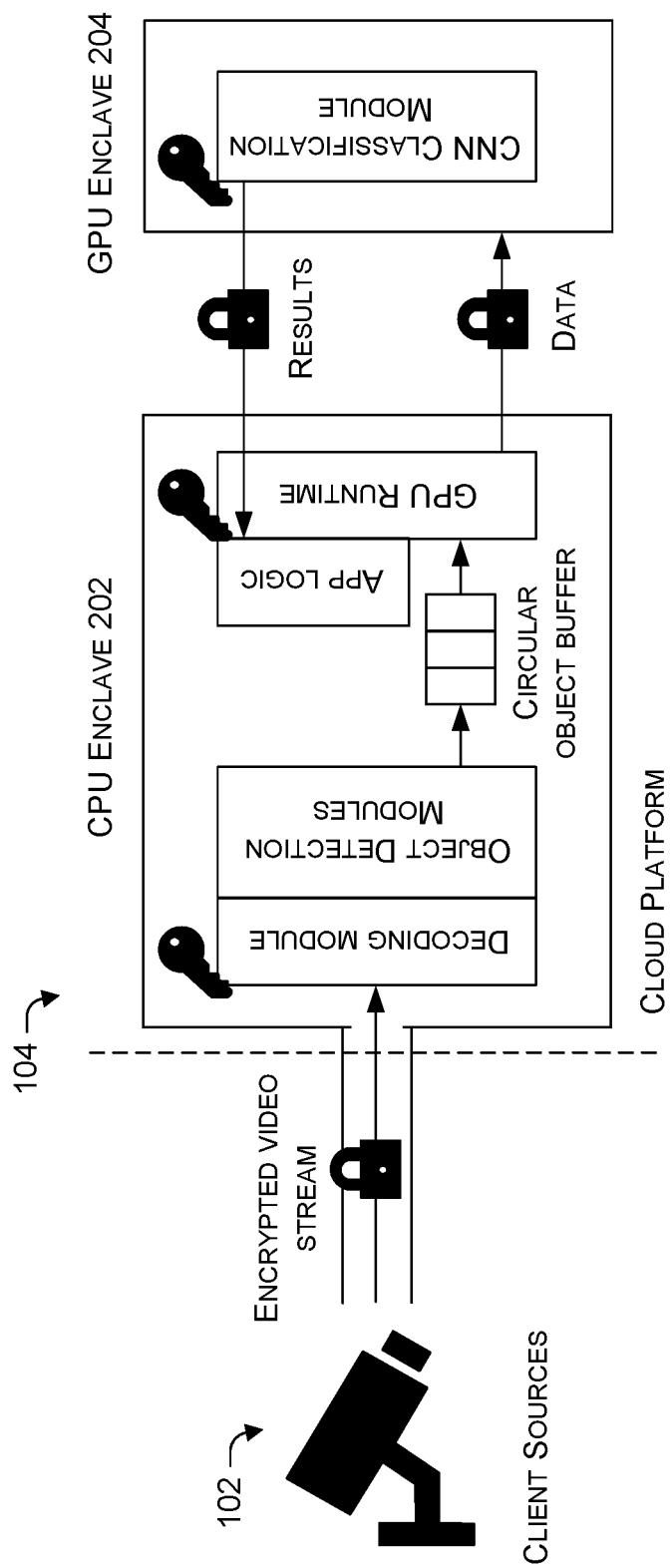
FIG. 2 illustrates an example scenario that is consistent with some implementations of the present concepts.

FIG. 2 illustrates an example architecture for the analytics system. The system can receive video streams from client source 102 over an encrypted channel, which can then be fed to the video processing pipeline, which can utilize a CPU enclave 202 (representing a particular implementation of central processing unit 106), and GPU enclave 204 (representing a particular implementation of secondary processing unit 108), which can provide security via combined processing of modules in the enclaves.

The video stream can be received inside CPU enclave 202, and frames of the video stream can be obliviously decoded into individual frames by decoding module 110, described in further detail below in Section IV. The system can then process the decoded frames by way of objection detection modules (which may include background subtraction module 112, bounding box detection module 114, and object cropping module 116) using oblivious image processing algorithms that can detect and extract objects from each frame, described in further detail below in Section V. The system can further extract the same number of objects for each frame (some of which are dummy, as per an upper bound) and feed them into a circular buffer, which can then be provided to GPU enclave 204, where they can be obliviously processed using the CNN running inside the GPU enclave, described in further detail below in Section VI. The predicted results can then be returned to the application inside the CPU enclave.

Although the CPU-GPU communication channel may transfer encrypted objects, an attacker that observes access patterns to the channel can infer the processing rate of objects, and consequently the number of detected objects. The system can address this leakage by enforcing a fixed inference rate (or batch size) for the CNN.

III. Oblivious Primatives

Data-oblivious algorithms used in the disclosed system can make use of a set of generic data-oblivious primitives. The x86 CMOV instruction, which can take as input two registers, a source register and a destination register, and can move the source to the destination if a condition is true, can serve as the base building block for these primitives. Once all the operands have been loaded into registers, the execution of this instruction can be immune to memory-access-based pattern leakage because registers are private to the CPU, making any register to register operations inherently oblivious.

One such oblivious primitive that can be used is the Oblivious selection (oselect) primitive. The oselect primitive can provide a wrapper around the CMOV instruction that can conditionally assign a value to the destination operand. This primitive can be used for performing dummy write operations by setting the input condition to false. Multiple versions of this primitive for different integer sizes can be implemented, and a vectorized version using SIMD instructions can also be implemented.

Another oblivious primitive that can be used is the Oblivious sort (osort) primitive. The osort primitive can obliviously sort an array with the help of a bitonic sorting network. Given an input array of size n, the network sorts the array by performing $O(n \log^2(n))$ compare-and-swap operations, which can be implemented using the oselect primitive. As the network layout is fixed given the input size n, execution of each network can have identical memory access patterns.

Another oblivious primitive that can be used is the Oblivious array access (oaccess) primitive. The oaccess primitive can access the i-th element in an array, without leaking the value of i. One implementation of oaccess may scan the entire array while performing oselect operations, with the condition set to true only at the i-th position. Moreover, as an attacker can observe memory access patterns only at the granularity of cache lines, it suffices to access the array at a cache-line granularity using oselect.

IV. Oblivious Video Decoding

When performing video encoding, a sequence of raw images, called frames, can be converted into a compressed bitstream. Frames can be of two types: keyframes and interframes. Keyframes may be encoded without using previous frames in the video stream as reference, and typically can exploit redundancy across pixels within the same frame. Interframes, on the other hand, can use prior frames as reference up to the most recent keyframe, and thus can exploit temporal redundancy in pixels across frames.

Figure 3:
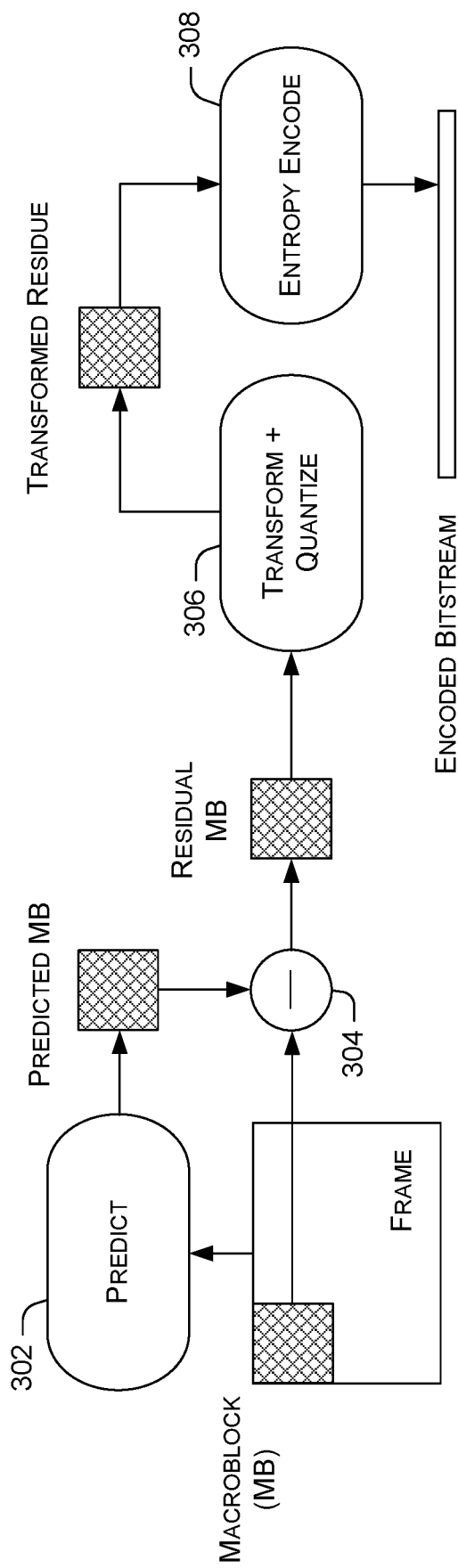
FIGS. 3-8 illustrate example processes that are consistent with some implementations of the present concepts

In the encoding process, a frame can be decomposed into square arrays of pixels called macroblocks, and then compressed using a process such as that depicted in FIG. 3. At step 302, an estimate of the macroblock can be first predicted using reference pixels (in a previous frame or the current frame). The prediction can then be subtracted from the actual macroblock at step 304 to obtain a residue.

At step 306, the residual macroblock can be decomposed into subblocks of 4×4 pixels. Each subblock can be transformed into the frequency domain (e.g., using a discrete cosine transform), and its coefficients can be quantized (i.e., each coefficient can be divided by a quantization factor), thus improving compression. At the end of step 306, each subblock may comprise a sequence of 16 data values, the last several of which may typically be zeros as the quantization factors for the later coefficients can be larger than those of the initial coefficients.

At step 308, each (quantized) subblock can be compressed into a variable-sized bitstream. In particular, the coefficients can be first variable-sized encoded using a small binary prefix tree into symbols and offsets. The symbols and offsets can then be encoded into a compressed bitstream using arithmetic encoding. In certain implementations, the binary prefix tree and any probability values for arithmetic encoding can be constructed using specifications associated with, for example, a VP8 encoder, however, alternative encoders and specifications can also be utilized.

Decoding module 110 can perform a reverse process of the steps described above: (i) the incoming video bitstream can be entropy decoded; (ii) the resulting coefficients can be dequantized and inverse transformed to obtain the residual macroblock; and (iii) previously decoded pixels can be used as a reference to obtain a prediction macroblock, which can then be added to the residue. These specific steps are described in greater detail below.

Bitstream Decoding

The bitstream decoding process (which may be a reverse of step 308 of FIG. 3 in the encoder) can be divided into two components: an entropy decoder and a parser. The entropy decoder can decode the compressed bitstream one bit at a time and return the decoded value to the parser. The parser can pass the probability values to the entropy decoder, and can also use the returned decoded bits to decode symbols and offsets into the coefficient's value.

The entropy decoder can take two inputs: (i) a pointer to the compressed bitstream that may be dereferenced at 2-byte granularity, and (ii) the probability that the next bit to be decoded has a value of "0". The entropy decoder can decide whether any more bits can be decoded at the current bitstream position based on internal state; if not, it can increment the bitstream pointer. Then, it can dereference the pointer, use the input probability to decode a single bit, and update its internal state.

The parser can decode each coefficient in a subblock by repeatedly invoking the entropy decoder and using the decoded bits to traverse the prefix tree. At each node in the tree, the parser can perform three operations. First, based on the node's position in the tree and the current pixel's position within the subblock, it can extract the corresponding probability value from the probability table and pass it to the entropy decoder. Second, it can use the decoded value returned by the entropy decoder to walk the prefix tree. Finally, once a symbol and offset are decoded into a coefficient (i.e., at a leaf node in the tree), it can assign the coefficient to the corresponding pixel.

However, in processing the data, the memory access patterns of data and code can result in leakage that may convey the exact coefficients of a pixel or a range of values for the coefficients. Specifically, as the entropy encoder dereferences the bitstream at 2-byte granularity, the number of decode operations between two pointer increments can leak the number of bits that were compressed per 2-byte chunk. Likewise, inferring the parser's traversal of the prefix tree can leak information about the coefficients being decoded. Inferring the coefficients can allow an attacker to distinguish pixels (and macroblocks) from each other, and potentially infer the outlines of the objects in the frame.

To prevent the exposure of information to outside attackers, the entropy decoder can be made oblivious by performing a fixed number of decode operations regardless of the number of coefficients that were compressed in each 2-byte chunk. That is, the entropy decoder can be configured to perform dummy decodes by adding an additional attribute (isDummy). All updates to internal state of the entropy decoder can use the oselect primitive to either perform a dummy update (if isDummy is true), or an actual update (if isDummy is false).

Moreover, an oblivious parser can be designed by decoupling the tree traversal from assignment of decoded data values to pixels. During typical operation of a non-oblivious parser, traversing the prefix tree can reveal information about the coefficient being decoded. The tree traversal can be made oblivious by modelling the prefix tree as an array, and obliviously traversing it by accessing its elements (i.e., the nodes) using oaccess. Next, each node in the tree can be made indistinguishable from others, by making each node perform an identical set of operations:

- To decode a bit at the node, obliviously fetch a probability value from the probability table using oaccess (by modeling the table as an array) and invoke the entropy decoder.
- Output a data value at each node (regardless of whether it is a leaf)—if the node is a leaf then output the decoded coefficient along with its pixel index, otherwise output a dummy coefficient with a pixel index of "0".

Finally, the tree can be augmented with a dummy node that performs the same operations, but invokes the entropy decoder with isDummy set to true so as to output dummy coefficients, which can make the node indistinguishable from the rest of the nodes in the tree. As a result, traversing the prefix tree does not reveal any information about the coefficients being decoded, as an attacker can only see that, at each node in the tree, a single bit was decoded and a single coefficient was produced as output.

As a result of the above phase of oblivious tree traversal, a set of actual and dummy coefficients can be provided along with an index that is "0" for dummies and the pixel positions for valid values. Then, performing an oblivious sort of this set of values based on the flags using osort can result in all the actual coefficients being contiguously ordered according to their pixel indices, while all dummies will be pushed to the front. At the end of the sort, all coefficients can be read off the end of the array sequentially.

Dequantization and Inverse Transformation

The decoding process can next (i) dequantize the coefficients decoded from the bitstream, followed by (ii) performing an inverse transformation to obtain the residual macroblocks. The dequantization step can multiply each coefficient by a quantization factor. The inverse transformation can be largely independent of the coefficients themselves, and can perform a set of identical arithmetic operations irrespective of the coefficient values. However, the inverse transformation may still leak information due to an optimization that can be used, such that if all but the first value of the 4×4 subblock are zeros, a simpler set of arithmetic operations can be used. To prevent this leakage, this optimization can be disabled without affecting correctness and without any impact on performance.

Prediction

The final stage in video decoding can include prediction. Once an estimate of the macroblock is predicted using a previously constructed macroblock as reference, the residual macroblock obtained after the inverse transformation can be added to the predicted macroblock to obtain raw pixel values.

In keyframes, macroblocks can be intra-predicted. That is, the prediction operation can use a macroblock that occurs earlier in the same frame as reference. In interframes, macroblocks are typically inter-predicted, and may use a reference macroblock from a previous frame. Intra-predicted macroblocks can be computed using one of several modes. A mode to encode a macroblock refers to a combination of pixels on its top row and left column used as reference in the encoding. The encoder can dynamically select the best mode and put in an identifier that the decoder can then use in its decoding process.

However, ensuring obliviousness of intra-prediction can require that the prediction mode, and specifically the location of the pixels used as reference, remain private. Otherwise, an attacker can identify the location of pixels that are most similar to each other, revealing information about the frame's contents. As such, intra-prediction can be made oblivious by evaluating all possible predictions for the pixel and storing the predictions in an array, such that each prediction is indexed by the value of its mode. Then, the oaccess primitive can be used to obliviously select the correct prediction from the array. This approach is considerably more efficient than other alternatives for obliviousness as the predicted values for several pixels can be computed simultaneously at the level of individual rows, which amortizes the cost of the operations.

In contrast to intra-prediction, inter-predicted macroblocks can use previously decoded frames as reference. Specifically, the location of the reference macroblock (which frame, and macroblock's coordinates therein) can be encoded into the bitstream, and can be used by the decoder to predict the current macroblock. However, ensuring obliviousness of inter-prediction requires that the reference macroblock remains private. Otherwise, an attacker observing access patterns during inter-prediction can thus discern the motion of objects across frames.

A naïve, but inefficient, approach to achieve obliviousness is to access all macroblocks in prior frames (up to the most recent keyframe) at least once, because if any macroblock is left untouched, the location of the untouched macroblock can be leaked to the attacker. Furthermore, some macroblocks even in interframes can be intra-predicted for coding efficiency, and hence oblivious approaches may need to conceal whether an interframe macroblock is inter-predicted or intra-predicted. As such, inter-prediction can be made oblivious by relying on empirically observed properties of video streams: (i) Most macroblocks in interframes are inter-predicted; and (ii) The coordinates of reference macroblocks are in close to the coordinates of inter-predicted macroblocks (in a previous frame).

These observations can enable two efficient approximations. First, it can be assumed that every macroblock in an interframe is inter-predicted. Though this may impact the accuracy of intra-predicted macroblocks, the loss of accuracy is minor. Second, the search space of reference macroblocks can be parameterized. That is, instead of scanning all macroblocks in prior frames, access can be made only to macroblocks that are within some specified distance of the current macroblock. If the reference macroblock is indeed within the search space, then that reference macroblock can be fetched obliviously using the oaccess primitive. Otherwise, if the reference macroblock is not within the search space, the macroblock at the same coordinates in the previous frame can be used as reference. Intra-predicted macroblocks can be likewise inter-predicted by using the macroblock in the previous frame as reference.

Video Encoder Padding

Another method by which can attacker can gain information about processing is by observing the incoming video stream over the network. Since the encoder can use a variable number of bits in each frame, this information can be exploited for fingerprinting video streams and providing valuable information or context about the video stream content. Additionally, such attacks by exploiting the variation in bits per frame is also applicable to the bitstream decoding process described earlier. This leakage of possible information can be fixed by modifying the video encoder to "pad" each frame with dummy bits to an upper bound before sending the stream to the decoding system. Upon receiving a padded stream, the system decoder can proceed in the fashion described in Section IV.

V. Oblivious Image Processing

As set forth above in Section IV, various obliviousness techniques can be applied to the processing of decoded frames on the CPU enclave. Furthermore, as depicted in FIG. 1, the video analytics pipeline includes a number of other processing modules beyond decoding module 110, and obliviousness techniques that can be used by these modules are also desirable for preventing inappropriate leakage of information.

Background Subtraction

The goal of background subtraction is to detect moving objects in a video. Specifically, background subtraction can be performed by background subtraction module 112 and can be used to identify stationary pixels that belong to the video's background, and then subtract them from each frame, thus producing a binary image with black background pixels and white foreground pixels, where the white foreground pixels can represent moving objects within the frame.

One method that can be used for detecting moving objects can be by modeling the background as a mixture of Gaussians. For example, let $\vec{x}^{(t)}$ denote the value of a pixel in RGB at time t. To estimate the probability of observing the current value $\vec{x}^{(t)}$, the algorithm can maintain a Gaussian mixture model for each pixel in the video stream:

$$p(\vec{x}^{(t)}) = \sum_{m=1}^{M} \pi_m N(\vec{x}; \vec{\mu}_m, \sigma_m^2 I)$$

where M is the total number of Gaussian components for the pixel, $\mu_m$ and $\sigma_m$ are the means and variances that describe the Gaussian components, I is the identity matrix, and the weight $\pi_m$ denotes the probability that the sample $\vec{x}^{(t)}$ comes from the m-th Gaussian component. The value of M can differ across pixels, but can be globally upper bound at a value $M_{max}$.

As more data samples arrive (with new frames), the algorithm can update each Gaussian component along with their weights $\pi_m$ such that, over time, components that represent background values for the pixel can come to have larger weights, while foreground values can be represented by components having smaller weights. To determine whether a pixel's current value $\vec{x}^{(t)}$ belongs to the background (BG), the algorithm can use the B Gaussian components with the largest weights:

$$p(\vec{x}^{(t)} | BG) = \sum_{m=1}^{B} \pi_m N(\vec{x}; \vec{\mu}_m, \sigma_m^2 I)$$

where B can be calculated to include all the components whose weight $\pi_m > c_f$. A pixel can then be labeled background if $p(\vec{x}^{(t)}|BG) > c_{thr}$.

Specifically, the algorithm for detecting moving objects can perform the following steps. First, the algorithm can start with a single Gaussian component for each pixel. Then, for every new data sample, it can repeat the following four steps per pixel.

1. Given a new data sample $\vec{x}^{(t+1)}$ at time t+1, the values of $\pi_m$, $\mu_m$, and $\sigma_m$ can be recursively updated per m.
2. Compute the distance of the sample from each of the M components. If no component is sufficiently close, add a new component, increment M, and if the new $M > M_{max}$, discard the component with the smallest weight $\pi_m$.
3. Sort the M components, descending by the weights $\pi_m$.
4. Finally, the algorithm can compute $p(\vec{x}^{(t)}|BG)$ using the B largest components (per the equation above), and output 1 if it is greater than a threshold $c_{thr}$ or 0 if not greater than the threshold.

However, leaking of information can be possible by observing the memory access patterns of the above algorithm. First, the number of Gaussian components M used to model each pixel can be observed, the addition of a new component to the model (step 2 of the algorithm) can be observed, and the number of components B that model the background (step 4 of the algorithm) can be observed. These leakages can reveal to an attacker how complex a pixel is in relation to others, i.e., whether a pixel's value stays stable over time or changes frequently. This can enable the attacker to identify the locations of moving objects in the image.

To avoid leaking of this information and to make background subtraction processing oblivious, the memory access patterns per pixel can be made independent of its value. In one implementation, the system can perform identical operations per pixel. For example, the processing may maintain $M_{max}$ Gaussian components for each pixel, of which ($M_{max}$-M) can be dummy components with an assigned weight of zero.

With specific reference to the steps of the algorithm, to make step 1 oblivious, each Gaussian component can be updated using oselect to either make dummy updates or do the actual operations, leading to identical access patterns.

To make steps 2-3 oblivious, the components can be obliviously sorted in-place using the osort primitive based on their weights $\pi_m$ (step-3 in the algorithm). If any component is close to the new sample, the last component can be overwritten with a new one; otherwise, M may be incremented and a dummy update can be made to the last component (step-2). Since the components may be already sorted by their weights in descending order, this can ensure that the updated component can be either a dummy or can have the lowest weight. The various updates can furthermore be performed using oselect.

Finally, in step 4, after computing B (as components with weight $\pi_m > c_f$), $p(\vec{x}^{(t)}|BG)$ can be computed by iterating over all $M_{max}$ components, where if the index of a component is larger than B, a dummy update can be made to the computed probability. As a result, access patterns of the computation can be independent of the value of $\vec{x}^{(t)}$, M and $\pi_m$, and hence oblivious.

Bounding Box Detection

Figure 5:
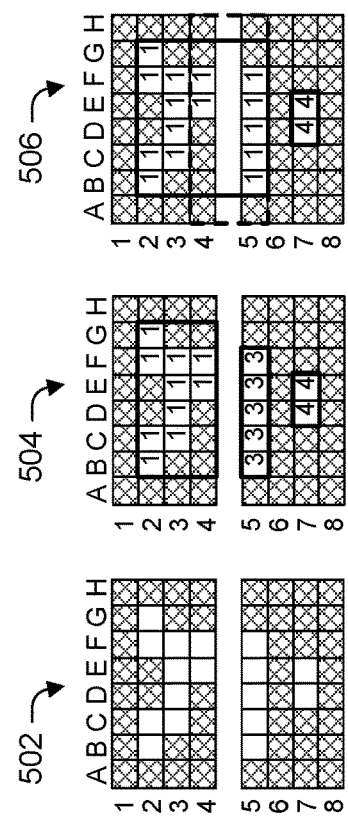
Figure 4:
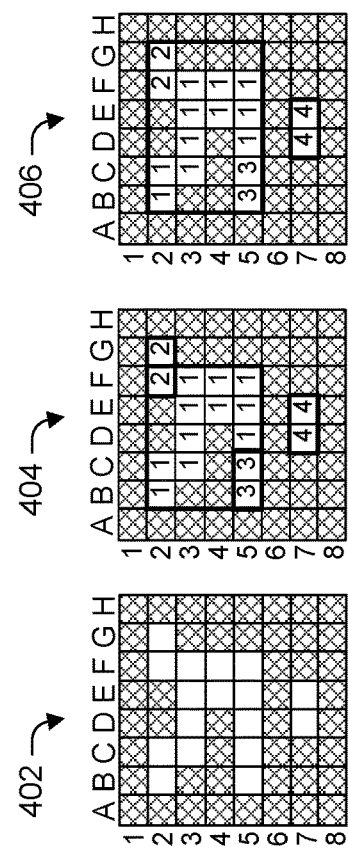

The output from background subtraction module 112 can be a binary image with black background pixels (depicted with hash marks in FIGS. 4 and 5) where the foreground objects are white blobs (depicted by white blocks in FIGS. 4 and 5). To find these objects, the edges of all blobs can be determined, which can then be used to compute the bounding box of each object, i.e., the smallest rectangle that can enclose the object blob.

One method that can be used to perform bounding box detection is a process of connected component labeling (CCL). The CCL algorithm can label each distinct blob in the binary image, where a blob ("connected component") can be a group of white pixels next to each other. FIG. 4 depicts the various steps that can be performed as part of the CCL algorithm. At step 402, the original binary image received by the bounding box detection module 114 may contain two blobs, depicted at step 402 as two separate white block sections. The algorithm can maintain a list L of tuples of the form (parent, bbox), where each tuple may correspond to a distinct "label" that will eventually be mapped to each blob. Initially, the list L can be empty. The parent field can identify other labels that are connected to the tuple's label, and the bbox field can maintain the coordinates of the bounding box of the label (or blob).

At step 404, the image can be scanned row-wise. Whenever a white pixel is detected, the algorithm can check if any of the pixel's neighbors scanned thus far were also white. In case no neighbor is white, the pixel can be assigned a new label l (as with pixels B2, F2, B5 and D7), and a new entry can be added to the list L corresponding to l, with its parent field set to l itself and bbox field as the coordinates of the current pixel. In case at least one neighbor is white, the pixel can be assigned the label of the neighbor $l_{nbr}$ with the smallest numerical value (e.g., at E3 and D5). The algorithm can record that all white neighbors are connected by setting the parent fields for each neighboring label to $l_{nbr}$ and updating the bbox field for $l_{nbr}$.

At step 406, the algorithm can merge the bounding boxes of all connected labels into a single bounding box. Specifically, for every label l in L, the algorithm can first obtain the parent label of l (say $l_{par}$), and then can update the bbox of $l_{par}$ to include the bbox of l. The algorithm can repeat the process recursively with $l_{par}$, until it reaches a root label $l_{root}$ whose parent value is the label itself. The process can repeat for all labels in L, until only the root labels are left behind. Each root label can correspond to a distinct object in the frame, as depicted at step 406.

However, the above algorithm can also leak information, as in step 402, each white pixel can result in an update to the list L, either by adding a new label, or by updating an existing label. Black pixels, however, may not result in a similar access. Thus, an attacker observing memory access patterns can correlate white pixel accesses with accesses to L, directly learning the locations of all white pixels. This can lead to leaking the size and positions of all foreground objects in the image. Therefore, the above algorithm can be modified for data obliviousness by relying on an empirical upper bound, N, on the total possible number of different labels, and a list of N tuples of the form (parent, bbox) can be maintained, with each tuple mapped to a distinct label.

Specifically, step 402 can be modified to perform identical operations for every pixel, whether black or white (though if the pixel is black, all operations are dummies). First, oselect can be used to identify the label for the current pixel (if it is white). Then, the bbox field mapped to the identified label can be updated by comparing it against the current pixel's coordinates. To prevent leaking the value of the label, the system can iterate over all the N tuples using the oaccess primitive and obliviously update the correct bbox via oselect, while making dummy updates to the rest. Next, the current pixel's label can be assigned to the parent field mapped to each neighboring label. Because the current pixel's label is selected to be the minimum of its neighbors, a label's parent field can then be less than or equal to the label itself.

For step 404, the connected labels can be obliviously merged. Iterating over the list of tuples N times, once per label, the chain of labels formed by the parent values can be traversed in reverse, until the root label that is its own parent is reached. This traversal may simply perform a single scan of the list. Then, the equivalence class of the label can be set to be the root label.

The oblivious algorithm can also be parallelized using a divide-and-conquer process. Specifically, as depicted in FIG. 5, the frame image can be divided into horizontal stripes at step 502. Then, at step 504, each stripe can be processed in parallel. For objects that span stripe boundaries, each stripe may output only a partial bounding box with the pixels within the stripe. Such partial bounding boxes can be combined by re-applying the algorithm to the boundaries of adjacent stripes at step 506. That is, given two adjacent stripes $S_i$ and $S_{i+1}$ having one below the other, the algorithm can be applied to the top row of $S_{i+1}$, comparing each pixel with its neighbors in the bottom row of $S_i$, and updating the labels based on this comparison.

Object Cropping

Upon performing bounding box detection, the pipeline can then proceed to object cropping module 116 to perform cropping of the objects specified by the bounding box(es) out of the frame for CNN classification. For ensuring continued obliviousness of the data, the system can ensure that the cropping of objects does not leak the positions of the cropped objects, or their dimensions.

For purposes of protecting information regarding the positions of the cropped objects, in one implementation, an object can be extracted obliviously by sliding a window horizontally with the same dimensions as the object across the frame in raster order, and the pixels covered by the window can be copied if its coordinates align with the object's bounding box. For the other positions, a dummy copy operation can be performed instead. However, this technique can require a large amount of processing, as for a m×n frame, and an object of size p×q, the technique can result in pq(m−p)(n−q) pixel copies, as compared to pq pixel copies when directly cropping the object. This technique can require a large amount of processing due to redundant copies. Specifically, while sliding the window forward by one pixel can result in a new position in the frame, a majority of the pixels copied may be the same as in the previous position.

Figure 6:
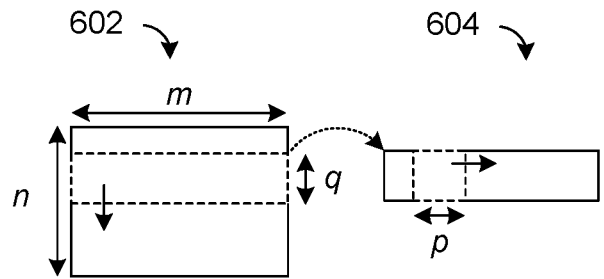

As such, the redundant pixel copies can be reduced by obliviously localizing the position of each object instead of trying out all possible positions. As depicted in FIG. 6, a first step 602 of the algorithm can extract a minimal horizontal strip of pixels containing the object, while a second step 604 can extract the object from the horizontal strip.

Specifically, in step 602, a horizontal strip of dimensions m×q can be allocated that has width m equal to that of the frame, and height q equal to that of the object. The strip can be slid vertically down the frame row by row. If the top and bottom edges of the strip are aligned with the object's bounding box, all pixels covered by the strip can be copied into a buffer. If the top and bottom edges of the strip are not aligned, dummy copy operations can be performed instead. This step can result in mq(n−q) pixel copies.

Next, at step 604, a window of size p×q equal to the object's size can be allocated, and this window can be slid column by column across the previously extracted strip. If the left and right edges of the window are aligned with the object's bounding box, the pixels covered by the window can be copied into the buffer. If the left and right edges of the window are not aligned, dummy copy operations can be performed instead. This step can result in pq(m−p) pixel copies.

For purposes of protecting information regarding the positions of the cropped objects, empirical upper bounds on object dimensions P and Q can be leveraged. Specifically, instead of cropping out the exact p×q object that forms a region of interest (ROI), a larger image of size P×Q can be obliviously cropped out such that it subsumes the object. To remove the extraneous pixels that surround an object, a buffer of size P×Q can be allocated. The ROI can then be obliviously copied from the cropped P×Q image into the new buffer without leaking its coordinates, while simultaneously scaling up the p×q object. An oblivious routine using bilinear interpolation can be used for scaling up the ROI.

Figure 7:
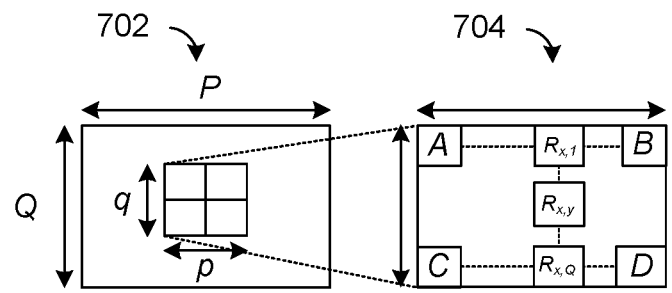

For example, suppose the ROI is of size 2×2 pixels, which can be scaled up to an image of size P×Q, as depicted in FIG. 7 at steps 702 and 704. Each pixel $R_{x,1}$ in the first row (where the subscripts indicate the pixel's coordinates) can be linearly interpolated using the values of pixels $R_{1,1}$=A and $R_{P,1}$=B (i.e., by computing a weighted average of A and B). Similarly, each pixel $R_{x,Q}$ in the last row can be linearly interpolated using the pixels $R_{1,Q}$=C and $R_{P,Q}$=D. An arbitrary pixel $R_{x,y}$ can thus be computed as a linear interpolation of pixels $R_{x,1}$ and $R_{x,Q}$, or in other words, a bilinear interpolation of pixels A, B, C, and D.

The scaling of the ROI can also be made oblivious. For example, for each pixel in the target P×Q image, the system can obliviously fetch the four pixels from the ROI that can be linearly combined to compute the pixel's value. Specifically, these pixels can be retrieved by performing a single scan of the cropped image with the help of the oaccess primitive. Overall, this approach may have PQ scans of the entire cropped image, where each scan can result in O(PQ) pixel accesses, yielding a net complexity of $O(P^2Q^2)$.

Figure 8:
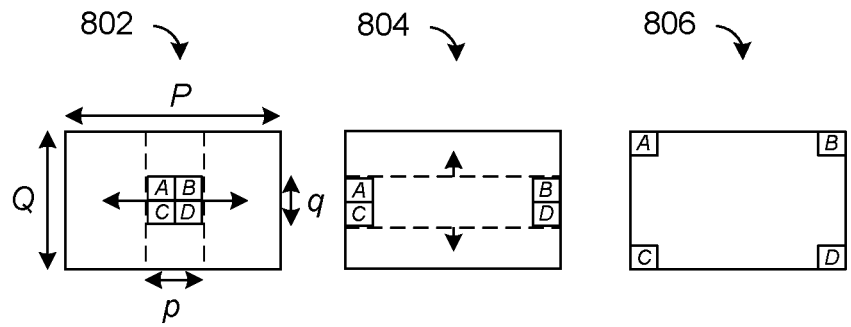

Efficiency can further be improved by resizing the ROI in two passes, using a process such as that depicted in FIG. 8. Specifically, instead of scaling up the ROI along both dimensions simultaneously, the ROI can be scaled along a single dimension per pass. Thus, in each pass linear interpolations can be performed, either row-wise or column-wise, instead of bilinear interpolations over the entire image, as depicted in steps 802, 804, and 806. The two passes may perform a total of $O(P^2Q+PQ^2)$ pixel accesses, which can improve asymptotic performance over the $O(P^2Q^2)$ algorithm.

VI. Oblivious CNN Classification on GPU

Finally, the video analytics pipeline can employ CNN classification within GPU enclave 204, and therefore, detected objects can be transferred from the CPU to the GPU for processing. However, this transfer can introduce potential leakage of confidential aspects of the processed data.

CPU-GPU Communication

Typically, CNN inference can be run in batches for efficiency, and the objects can get transferred from the memory queue to the GPU for inference. If each frame's objects are pulled per batch for inference, then observing the CPU-GPU channel usage can potentially leak the number of objects detected in each frame, thus violating confidentiality of the data.

To prevent this leakage of information, a fixed inference rate can be enforced regardless of the number of detected objects (k) in each frame. For accurate inference, this can entail padding the set of objects sent to the GPU. While $k_{max}$ objects (i.e., the maximum number of objects that is likely to occur) per frame can be inferred, this can lead to a GPU resource wastage of $(k_{max}-k)$ inferences per frame. Therefore, in one implementation, the system can run CNN inference on k' ($\ll k_{max}$) objects per frame. The CPU pipeline can extract the objects per frame (including any dummy objects) and push them into the head of the circular buffer. A consumer thread can dequeues k' objects from the tail of the buffer at a fixed rate (e.g., once/frame) and can send them to the GPU.

The number of processed dummy objects can also be reduced while ensuring that all detected objects are processed by the GPU. The buffer can be sorted using the osort primitive in ascending order of priority values (where dummy objects can be assigned a lower priority), thus moving dummy objects to the head of the buffer and pushing detected objects to the tail of the buffer. Consuming from the tail of the buffer can ensure that dummy objects at the head of the buffer are overwritten before their inference. Furthermore, the buffer size can be set large enough to avoid overwriting actual objects, while limiting the cost of sorting.

The consumption (or inference) rate k' can be set relative to the actual number of objects in the frame. Too high a value of k' can result in GPU wastage due to dummy inferences, while too low a value can lead to delay in the processing of the objects in the frame (and potentially overwriting them in the circular buffer). In certain implementations, a value of $k'=2 \times k_{avg}$ can be used, where $k_{avg}$ is the average number of objects in a frame, which can prevent unnecessary delay and wastage of resources.

CNN Classification

CNN operations, such as matrix multiplications, can have data-independent access patterns, while non-oblivious operations may be limited to conditional assignments. Given an input x, the ReLU (rectified linear unit) function can replace x with max(0,x), and likewise, the max-pooling layer can replace each value within a square input array with its maximum value.

Oblivious implementations of the max operator may use the CUDA max and f max intrinsics for integers and floats, which can get compiled to the IMNMX and FMNMX instructions that can branchlessly perform the max operation, which can ensure that the machine code is free of data-dependent access patterns. Moreover, in certain implementations, this optimization can be employed to eliminate expensive control-flow divergence across GPU threads, which can ensure that the process of CNN inference is oblivious.

VII. Example Oblivious Processing Method

Figure 9:
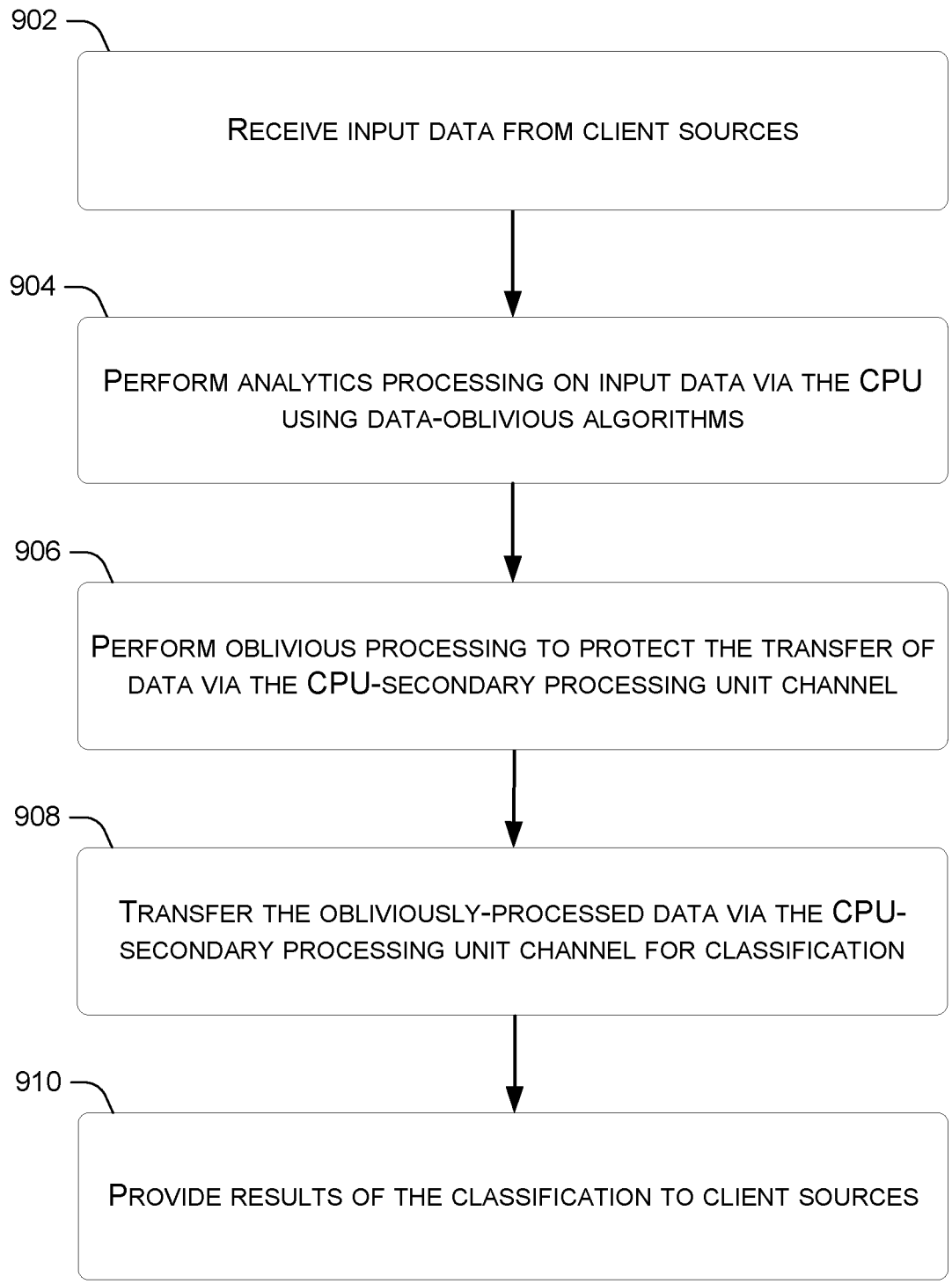
FIG. 9 illustrates an example method or technique that is consistent with some implementations of the present concepts.

The following discussion presents an overview of functionality regarding the oblivious processing of input video data according to one implementation. FIG. 9 illustrates an exemplary method 900, consistent with the present concepts. Method 900 can be implemented by a single device, e.g., cloud device 104, or can be distributed over one or more devices. Moreover, method 900 can be performed by one or more modules, such as decoding module 110, background subtraction module 112, bounding box detection module 114, object cropping module 116, or CNN classification module 118.

At block 902, input data may be received from one or more client sources 102. The input data may be video stream data recorded, for example, by source cameras or other IoT devices. However, it is to be appreciated that method 900 can be performed on various other types of input data, and is not limited to video stream data, but can be applied to any data where data-dependent processing steps can be discoverable via side-channel attack. Moreover, client sources 102 may be any type of computing device or computing component that can issue data for processing.

At block 904, the system may perform analytics processing of the input data on CPU 106 using data-oblivious algorithms, such as those described above in Sections IV-VI. For example, background subtraction module 112 may perform background subtraction on decoded frame data received from decoding module 110, and the processing that is performed by background subtraction module 112 may use data-oblivious algorithms to render access patterns or operations performed during the analytics processing data-independent, or otherwise indistinguishable from other data processing.

At block 906, the system may perform oblivious processing on the processed data received from the analytics processing to protect the transfer of the processed data from CPU 106 to secondary processing unit 108. For example, the data may be padded with dummy objects such that the total number of objects extracted as a result of the analytics processing cannot be determined.

At block 908, the oblivious data can be transferred between CPU 106 to secondary processing unit 108 via a communication channel for classification processing, such as by CNN classification module 118.

Finally, at block 910, the results from the classification can be provided to the client sources 102.

VIII. Device Implementations

Figure 10:
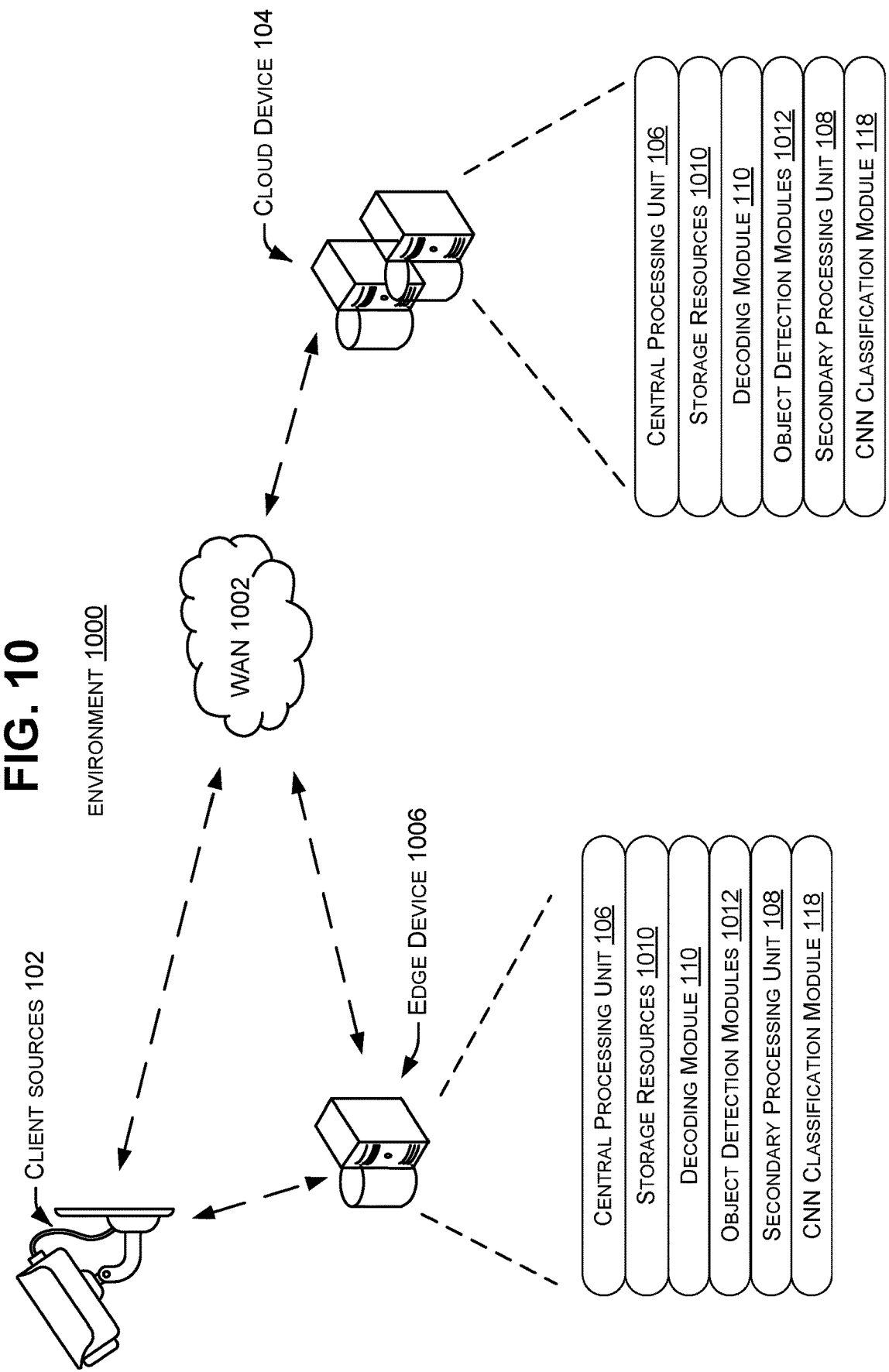
FIG. 10 illustrates an example system that is consistent with some implementations of the present concepts.

The present implementations can be performed in various scenarios on various devices. FIG. 10 shows an example environment 1000 in which the present implementations can be employed, as discussed more below.

As shown in FIG. 10, environment 1000 can include one or more client sources 102 (depicted as source cameras), and a cloud device 104 connected by WAN 1002 to client sources 102. Furthermore, edge device 1006 may be included in environment 1000, which may receive data from client sources 102 and provide data for processing by cloud device 104. Furthermore, in some instances, edge device 1006 may provide suitable processing of input data from client sources 102 in the event that cloud device 104 may be unavailable, such as via a network outage. Note that the edge device can be embodied as a server as depicted in FIG. 10, but may also be any sort of computer that has sufficient processing capability to perform video analytics, and in some instances, may include portable devices with dedicated GPUs. Likewise, the cloud device 104 can be implemented using various types of computing devices.

Generally, cloud device 104 (and likewise edge device 1006) may have respective processing resources, such as a central processing unit 106 and storage resources 1010, which are discussed in more detail below. The devices may also have various modules that function using the processing and storage resources to perform the techniques discussed herein, as discussed more below. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Generally, either cloud device 104 or edge device 1006 depicted in FIG. 10 can include the various modules discussed with reference to FIG. 1. Specifically, each of the devices may include a decoding module 110, and various object detection modules 1012 (which may include background subtraction module 112, bounding box detection module 114, and/or object cropping module 116). Furthermore, cloud device 104 or edge device 1006 may also include a secondary processing unit 108, which may execute a CNN classification module 118. The functionality of these modules is discussed above with reference to FIGS. 1-8.

While FIG. 10 depicts only certain devices, it is to be appreciated that several alternative devices could be used in place of, or in addition to cloud device 104 and edge device 1006. Specifically, as long as a device has some computational hardware, the device can be used to perform video analytics according to the implementations set forth above. Of course, not all device implementations can be illustrated and other device implementations should be apparent to the skilled artisan from the description above and below.

The term "device", "computer," "computing device," "client source," "edge device," and or "cloud device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore.

Storage resources 1010 can be internal or external to the respective devices with which they are associated. The storage resources 1010 can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a central processing unit 106, which may be a general-purpose hardware processor, and storage resources 1010. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods described herein can be performed on a single computing device and/or distributed across multiple computing devices that communicate over WAN 1002. Without limitation, WAN 1002 can include one or more local area networks (LANs), the Internet, and the like.

IX. Additional Examples

Various device examples are described above. Additional examples are described below. One example includes a system comprising a central processing unit having a first enclave within a trusted execution environment, the first enclave being configured to perform secure processing on the central processing unit, a secondary processing unit having a second enclave within a trusted execution environment, the second enclave being configured to perform secure processing on the secondary processing unit, and a computer-readable storage media storing computer-readable instructions, which when executed by the central processing unit, causes data processing to be performed within the first and second enclaves, the data processing including additional obliviousness processing that obscures individual processing stages and further obscures communication of data between the first and second enclaves.

Another example can include any of the above and/or below examples where the system further comprises a communications channel between the central processing unit and the secondary processing unit for transmitting data.

Another example can include any of the above and/or below examples where the obliviousness processing renders access patterns or operations associated with the data indistinguishable by padding the data with dummy data or performing dummy operations.

Another example can include any of the above and/or below examples where the obliviousness processing utilizes at least one data-oblivious primitive.

Another example can include any of the above and/or below examples where the data processing is performed on at least one data set received from one or more client sources.

Another example can include any of the above and/or below examples where the data processing further includes video analytics processing of video data that makes up the at least one data set.

Another example can include any of the above and/or below examples where the video analytics processing includes performing video pre-processing that is performed within the first enclave.

Another example can include any of the above and/or below examples where the video pre-processing includes at least one of video decoding processing, background subtraction processing, bounding box detection processing, and object cropping processing that is performed within the first enclave.

Another example can include any of the above and/or below examples where the obliviousness processing performed as part of the background subtraction processing maintains a set number of Gaussian components per pixel, wherein a subset of the set number of Gaussian components are dummy components with an assigned weight of zero.

Another example can include any of the above and/or below examples where the obliviousness processing performed as part of the bounding box detection processing utilizes a modified connected component labeling algorithm that performs update operations for every pixel.

Another example can include any of the above and/or below examples where a portion of the update operations are dummy update operations that are performed on background pixels as part of the modified connected component labeling algorithm.

Another example can include any of the above and/or below examples where the computer-readable instructions, when executed by the central processing unit, further cause the central processing unit to transfer, from the first enclave to the second enclave, a set of detected objects from the at least one data set along with dummy objects to prevent side-channel determination of how many objects are in the set of detected objects.

Another example can include a system comprising a central processing unit providing an enclave in a trusted execution environment and a computer-readable storage medium storing computer-readable instructions, which when executed by the central processing unit, cause the system to: receive input data for processing in the enclave, perform analytics processing of the input data, the analytics processing including oblivious processing that renders access patterns or operations data-independent, and perform oblivious processing on results from the analytics processing to obscure communication of the results from the analytics processing.

Another example can include any of the above and/or below examples where the access patterns or operations performed during the analytics processing are rendered data-independent by performing obliviousness processing on the input data such that operations performed by the central processing unit appear identical.

Another example can include any of the above and/or below examples where the operations performed by the central processing unit appear identical by padding the input data with dummy data or performing dummy operations.

Another example can include any of the above and/or below examples where the obliviousness processing utilizes at least one data-oblivious primitive.

Another example can include a method comprising receiving input data from one or more client sources, performing analytics processing of the input data on a CPU to generate processed data, the analytics processing using data-oblivious algorithms that prevent data-dependent memory access patterns during analytics processing, performing oblivious processing on the processed data to obscure transfer of the processed data from the CPU to a secondary processing unit for additional processing, and providing results of the additional processing to the one or more client sources.

Another example can include any of the above and/or below examples where the data-oblivious algorithms use dummy data or dummy operations to pad the input data.

Another example can include any of the above and/or below examples where the data-oblivious algorithms utilize at least one data-oblivious primitive.

Another example can include any of the above and/or below examples where the data-oblivious algorithms are executed within a trusted execution environment of the CPU or the secondary processing unit.

X. Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A system comprising:
   memory storing computer-executable instructions;
   a central processing unit; and a secondary processing unit, wherein the computer-executable instructions when executed by at least one of the central processing unit or the secondary processing unit cause the system to:
perform first secure data processing of a first data set within a first enclave on the central processing unit, wherein the first secure data processing results in a set of detected objects;
add a set of dummy objects to the set of detected objects;
generate a second data set according to a fixed inference rate by extracting a same number of objects including one or more dummy objects and one or more detected objects;
transmit the second data set from the central processing unit to the secondary processing unit over a secure channel, wherein a count of the one or more detected objects cannot be determined based on the same number of objects of the second data set;
perform second secure data processing of the second data set within a second enclave on the secondary processing unit, wherein the second secure data processing comprises deprioritizing processing of the one or more dummy objects, and wherein the second secure data processing results in a third data set; and
transmit the third data set from the secondary processing unit to the central processing unit over the secure channel.

2. The system of claim 1, further comprising a communications channel between the central processing unit and the secondary processing unit for transmitting data.

3. The system of claim 1, wherein generating the second data set comprises performing obliviousness processing that renders at least one of access patterns or operations associated with the second data set indistinguishable.

4. The system of claim 3, wherein the obliviousness processing utilizes at least one data-oblivious primitive.

5. The system of claim 1, wherein the first data set is received from one or more client sources.

6. The system of claim 1, wherein the first secure data processing further includes video analytics processing of video data that makes up the first data set.

7. The system of claim 6, wherein the video analytics processing includes performing video pre-processing that is performed within the first enclave.

8. The system of claim 7, wherein the video pre-processing includes at least one of video decoding processing, background subtraction processing, bounding box detection processing, and object cropping processing that is performed within the first enclave.

9. The system of claim 8, wherein generating the second data set comprises performing obliviousness processing, wherein the obliviousness processing performed as part of the background subtraction processing maintains a set number of Gaussian components per pixel, wherein a subset of the set number of Gaussian components are dummy components with an assigned weight of zero.

10. The system of claim 8, wherein generating the second data set comprises performing obliviousness processing, wherein the obliviousness processing performed as part of the bounding box detection processing utilizes a modified connected component labeling algorithm that performs update operations for every pixel.

11. The system of claim 10, wherein a portion of the update operations are dummy update operations that are performed on background pixels as part of the modified connected component labeling algorithm.

12. The system of claim 1, wherein the computer-executable instructions, when executed by the central processing unit, further cause the central processing unit to transfer, from the first enclave to the second enclave, the second set of data including the one or more dummy objects and one or more detected objects to prevent side-channel determination of how many objects are in the second set of data.

13. A system comprising:
memory storing computer-executable instructions;
a central processing unit providing a first enclave in a trusted execution environment; and
a secondary processing unit providing a second enclave in the trusted environment, wherein the computer-executable instructions when executed by at least one of the central processing unit or the secondary processing unit cause the system to:
receive input data for processing in the first enclave;
perform analytics processing of the input data, wherein the analytics processing results in a set of detected objects;
add a set of dummy objects to the set of detected objects;
perform oblivious processing by generating a data set according to a fixed inference rate by extracting a same number of objects including one or more dummy objects and one or more detected objects to obscure communication of the results from the analytics processing; and
transmit the data set from the central processing unit to the secondary processing unit over a secure channel, wherein a count of the one or more detected objects cannot be determined based on the same number of objects of the data set.

14. The system of claim 13, the oblivious processing further rendering access patterns or operations performed during the analytics processing data-independent such that operations performed by the central processing unit appear identical.

15. The system of claim 14, wherein the operations performed by the central processing unit appear identical by padding the input data with dummy data or performing dummy operations.

16. The system of claim 15, wherein the oblivious processing utilizes at least one data-oblivious primitive.

17. A method comprising:
receiving input data from one or more client sources;
performing analytics processing of the input data on a CPU to generate a first data set comprising a set of detected objects;
performing oblivious processing on the first data set to obscure transfer of the processed data from the CPU to a secondary processing unit for additional processing, the oblivious processing comprising:
adding a set of dummy objects to the set of detected objects;
generating a second data set according to a fixed inference rate by extracting a same number of objects including one or more dummy objects and one or more detected objects; and
transmitting the second data set from the CPU to the secondary processing unit over a secure channel, wherein a count of the one or more detected objects cannot be determined based on the set number of objects of the second data set;

performing the additional processing of the second data set on the secondary processing unit, wherein the additional processing includes deprioritizing processing of the one or more dummy objects, and wherein the additional processing results in a third data set; and
providing the third data set to the one or more client sources.

18. The method of claim 17, wherein performing the oblivious processing comprises using data-oblivious algorithms that utilize dummy data or dummy operations to pad the input data.

19. The method of claim 18, wherein the data-oblivious algorithms utilize at least one data-oblivious primitive.

20. The method of claim 18, wherein the data-oblivious algorithms are executed within the trusted execution environment of the CPU or the secondary processing unit.

* * * * *